United States Patent [19]

Bogentoft et al.

[11] Patent Number: 5,462,742
[45] Date of Patent: Oct. 31, 1995

[54] GEL-FORMING LIQUID DIETARY FIBRE COMPOSITION

[75] Inventors: Conny Bogentoft, Vällingby; Anders Carlsson, Stockholm, both of Sweden; Janet Tomlin, Sheffield, United Kingdom

[73] Assignee: Pharmacia AB, Sweden

[21] Appl. No.: 64,103

[22] PCT Filed: Oct. 30, 1991

[86] PCT No.: PCT/SE91/00730

§ 371 Date: Jul. 22, 1993

§ 102(e) Date: Jul. 22, 1993

[87] PCT Pub. No.: WO92/09212

PCT Pub. Date: Jun. 11, 1992

[30] Foreign Application Priority Data

Nov. 22, 1990 [SE] Sweden .................................. 9003713

[51] Int. Cl.[6] .............................. A61K 9/00; A61K 9/08; A61K 31/70
[52] U.S. Cl. ................... 424/439; 514/892; 514/909; 514/910; 514/911; 514/944; 514/975; 424/78.01
[58] Field of Search ................................. 424/439, 78.01; 514/909, 910, 911, 781, 892, 975

[56] References Cited

U.S. PATENT DOCUMENTS

| | | | |
|---|---|---|---|
| 4,042,719 | 8/1977 | Zimmermann et al. | 426/573 |
| 4,474,751 | 10/1984 | Haslam et al. | 424/78 |
| 4,474,752 | 10/1984 | Haslam et al. | 424/78 |
| 4,474,753 | 10/1984 | Haslam et al. | 424/78 |
| 4,478,822 | 10/1984 | Haslam et al. | 424/78 |

FOREIGN PATENT DOCUMENTS

| | | |
|---|---|---|
| 0529401 | 9/1956 | Canada . |
| 0157695A3 | of 1985 | European Pat. Off. . |
| 0157695 | 9/1985 | European Pat. Off. . |
| 0323510A1 | 8/1987 | European Pat. Off. . |
| 0386960A2 | of 1990 | European Pat. Off. . |
| WO89/11503 | 11/1989 | WIPO . |

OTHER PUBLICATIONS

63–Pharmaceuticals, vol. 97, 1982, p. 413.

Primary Examiner—Gollamudi S. Kishore
Assistant Examiner—James Spear
Attorney, Agent, or Firm—Pollock, Vande Sande & Priddy

[57] ABSTRACT

A dietary fibre composition comprising a water-soluble, nononic cellulose ether having a cloud point not higher than 35° C. in combination with a charged surfactant and optional additives in water, the ratio of surfactant to cellulose ether being 1:5 to 1:25 by weight, is a liquid solution at room temperature and a gel in the gastrointestinal tract at body temperature. The dietary fibre composition can be used as a bulk laxative and also as a slimming aid.

7 Claims, 1 Drawing Sheet

GEL-FORMING LIQUID DIETARY FIBRE COMPOSITION

DESCRIPTION

1. Technical Field

The present invention refers to a dietary fibre composition which is liquid at room temperature and a gel in the gastrointestinal tract at body temperature.

2. Background of the Invention

The term "dietary fibre" is often used to describe non-starch polysaccharides which are not digested by enzymes of the upper intestinal tract. The term includes a variety of substances with different chemical and physical properties which have a number of effects on the gastrointestinal tract; by virtue of their indigestibility in the stomach and small intestine they alter patterns of motility and the rate and site of absorption of other substances. In the colon, however, their effect is largely determined by the polysaccharide linkages present which may or may not be broken down by bacterial enzymes. As the composition of the invention comprises an aqueous solution of a modified cellulose derivative which is a clear flowing liquid at room temperature but gels in the stomach at body temperature, said composition has been called a "liquid fibre".

The liquid fibre can be used as a slimming aid and/or as a bulk laxative.

In our society obesity has become a serious problem, which could however be helped by a reduced food intake. Some soluble dietary fibres forming viscous solutions in water, i.e. guar gum and methyl cellulose, have previously been shown to be efficient to a certain extent at decreasing energy intake and causing weight loss in obese subjects. Their precise mode of action has not been definitely established but they are known to slow gastric emptying.

Another problem also associated with our way of living is constipation, which in some cases could be remedied by means of dietary fibre, a kind of bulk-forming laxative. The effect of fibre on bowel performance—to increase the amount, consistency and volume of stool passed—has been known for centuries.

Bulk laxatives are polysaccharide hydrocolloids which swell when placed in aqueous solutions because of their strongly hydrophilic properties. They belong to a group of viscous polysaccharides used in the food industry which are derived from various sources: plant seeds (isphagula or psyllium, guar gum, locust bean gum), fruit (pectins), plant exudates (gum karaya and tragacanth), marine-plants and algae (carrageenan and agar), microorganisms (xanthan gum) or are chemically modified natural substances (methyl cellulose and carboxymethyl cellulose). A property that they share with the non-starch polysaccharides is that they are unaffected by human digestive enzymes, and so the molecules pass relatively intact through the small intestine to the colon.

The physiological effects of dietary fibres could be summarized as follows. Fibre causes an increase in stool weight and changes in bowel habit. This is partly due to the presence of undigested fibre and its water-holding capacity, although most types of dietary fibre are extensively degraded in the gut. The site of this degradation is the large intestine, which contains many anaerobic bacteria which may produce the appropriate enzymes for breaking down these polysaccharides. The breakdown of fibres by the flora is known as fermentation and is an important part of large bowel function. As a result of the fermentation the fibres are converted mainly to short-chain fatty acids (SCFA) which are absorbed and provide a readily available source of energy to the host. SCFA's also stimulate salt and water absorption from the colonic lumen. The breakdown of dietary fibres in the large intestine also stimulates microbial growth, which in turn contributes to an increased faecal mass.

There are several dietary fibre products on the market today; fibers made up mainly of polysaccharides. Different cellulose ethers have been used as bulk laxatives, such as ethyl hydroxyethyl cellulose, methyl cellulose and the sodium salt of carboxymethyl cellulose. Methyl cellulose has also, as well as guar gum, been marketed as a slimming agent. One major disadvantage in the use of these types of polysaccharides is the difficulty in controlling their swelling behaviour. The dry dietary fibre is either taken as a tablet or dispersed in an aqueous medium, thus giving rise to a very rapid swelling through the binding of water molecules to the polysaccharide, i.e. the gelling of the fibre takes place more or less instantaneously. The highly viscous dispersion which is then formed becomes difficult to ingest if not taken immediately. Therefore, the common dietary fibres have a relatively low patient compliance due to their rapid gel formation at room temperature.

There has been controversy in the popular press as to whether there might be some danger of intestinal obstruction or rupture caused by the hydrophilic swelling of these products in the GI tract, particularly in the oesophagus.

The guar gum containing products may also cause excessive levels of flatulence, bloating and borborygmi (bowel sounds) as this material is readily digested by the faecal bacteria to gases.

EP 323 510 refers to a food composition which comprises water-soluble fibres in combination with proteins having an isoelectric point in the acidic region, and this food composition is presented as an aqueous solution. In contact with gastric juice the composition is said to gel and stay in the stomach for a long time, and so prevents overeating.

Recently the interactions between nonionic cellulose ethers, in particular ethyl hydroxyethyl cellulose (EHEC) and charged surfactants in aqueous solution were found to give rise to thermogelling systems which were liquid at room temperature but became viscous at an increased temperature (Berol PCT/SE89/00266).

SUMMARY OF THE INVENTION

In accordance with the invention it has now been found that a combination of certain nonionic cellulose ethers and charged surfactants in water that is liquid under ambient conditions, gels in the stomach after being swallowed. It is surprising that a viscous gel can be formed and maintained in the low pH gastric environment.

The object of the present invention is a dietary fibre composition, which comprises a water-soluble, nonionic cellulose ether having a cloud point not higher than 35° C., a charged surfactant and optional additives in water, the ratio of surfactant to cellulose ether being 1:5 to 1:25 by weight, which composition is a liquid solution at room temperature and forms a gel in the gastrointestinal tract at body temperature.

The liquid form of the product allows greater palatability which in turn should improve long-term compliance. Another advantage is that the product is already fully hydrated and can not further increase in volume when it is consumed so that there is no danger of obstruction occurring in the gut.

BEST AND VARIOUS MODES FOR CARRYING OUT INVENTION

Figure 1:
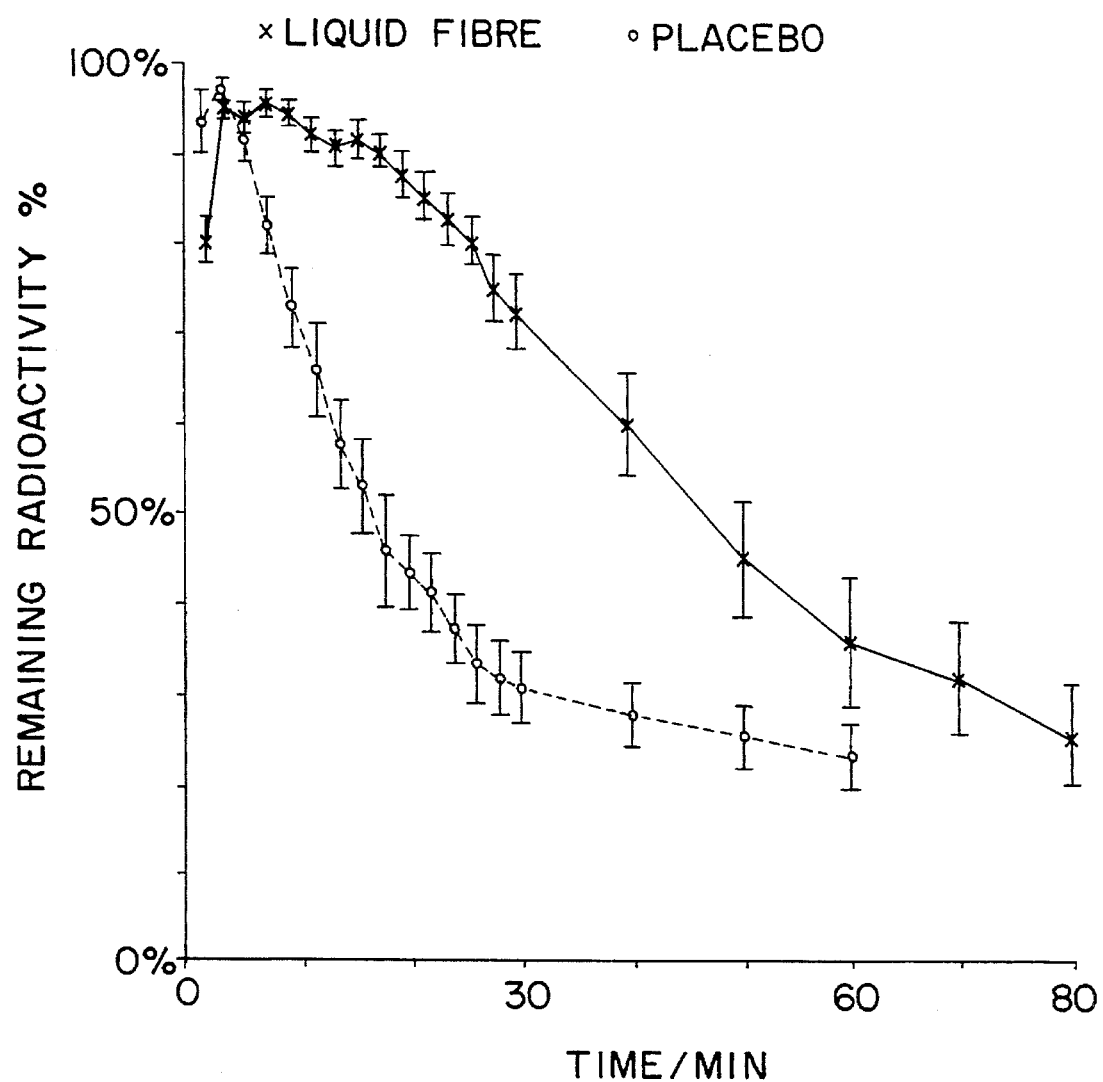
FIG. 1 is a curve demonstrating gastric emptying.

The nonionic cellulose ethers in the composition of the invention are based on cellulose which has been chemically modified in order to attain solubility in water by substitution of various groups onto the cellulose backbone. The types and numbers of substituents should be chosen in such a way as to give the cellulose ether a limited solubility with respect to temperature increases. Thus aqueous solutions of the cellulose ethers have a particular temperature above which a two-phase system is formed, which intially causes a strong light scattering and thus the system has a cloudy appearance—this temperature is commonly referred to as the cloud point (CP) temperature.

Cloud point (CP) temperatures are determined on a Mettler FP5+FP51 spectrophotometer. The sample solution (1.0 wt % aqueous cellulose ether solution in a capillary tube) is heated at a rate of 10° C./min. The CP is then graphically determined as the break-point in the recorded absorbance-versus-time curve.

In order to be liquid at room temperature and gel at body temperature, that is about 37° C., the cellulose ethers should have a CP not higher than 35° C.

The properties of the cellulose ethers are determined by the type of substituents and also by their number and distribution along the molecule.

The most appropriate cellulose derivatives are nonionic, where alkyl and/or hydroxyalkyl groups are attached to the anhydroglucose units by ether linkages, that is alkyl hydroxyalkyl celluloses, wherein the alkyl groups have from 1 to 4 carbon atoms.

Representative cellulose ethers are methyl cellulose (MC), methyl hydroxyethyl cellulose (MHEC), methyl hydroxypropyl cellulose (MHPC), ethyl hydroxyethyl cellulose (EHEC), and hydroxypropyl cellulose (HPC). These polymers all have substituents that are either nonpolar (e.g. methyl) or slightly polar (e.g. hydroxyethyl) which in combination with the hydrophilic cellulose backbone give rise to an amphiphilic polymer.

A preferred cellulose ether is EHEC, having the chemical formula

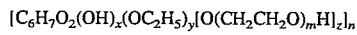

$$[C_6H_7O_2(OH)_x(OC_2H_5)_y[O(CH_2CH_2O)_mH]_z]_n$$

where n is the degree of polymerisation, y is the degree of ethyl substitution ($DS_{ethyl}$), and (m+z) is the molar hydroxyethyl (ethylene oxide; EO) substitution ($MS_{EO}$). The average values of y and (m+z) could range from 1.2 to 2.5 and from 0.5 to 1.5, respectively; the actual values are dependent on n and the heterogeneity of substitution.

The substitution of EHEC is thus characterized by the values $DS_{ethyl}$ and $MS_{EO}$: the former value equals the average number of hydroxyl groups on the anhydroglucose unit which has been substituted by ethyl groups, whereas the latter corresponds to the average total number of ethylene oxide groups substituted on the anhydroglucose unit. Ethylene oxide (hydroxyethyl) can form short oligo(ethylene oxide) chains and thus $MS_{EO} \geq DS_{EO}$.

The molecular weight, i.e. the degree of polymerisation (n), of the cellulose ether seems to be less important for obtaining the gelling effect. This may be because all the employed solutions are semi-dilute, i.e. the cellulose ether concentrations considerably exceed the so-called overlap concentration.

A necessary requirement of the cellulose ether sample is that the cloud point should not exceed 35° C., measured as described previously.

The following test was performed to check the gel forming ability of the cellulose ether:

A 1.00 wt % aqueous solution of the cellulose ether is prepared. Sodium dodecyl sulphate (BDH, Poole, England; specially pure) is then added to give a concentration of $3.00 \times 10^{-3}$ molal. The resulting, clear solution is transferred to a Bohlin VOR rheometer (Bohl in Reologi, Lund, Sweden) on which a viscometry test is carried out using the following instrument settings: Measuring system: C 25; torque element: 21.6 g cm (or equivalent); shear rate 0.232 $s^{-1}$; start temperature 20.0° C.; end temperature 37.0° C.; heating rate: 2° C./min; thermal equilibrium time: 30 min.

In order to be acceptable, the measured viscosity of the test solution at 37.0° C. (after 30 min) must exceed 50 Pas. Normally, the viscosity is less than 0.5 Pas at 20.0° C. This means that the viscosity of the system must increase by at least two orders of magnitude on heating from 20.0° to 37.0° C. (allowing a thermal equilibrium time of 30 min).

A preferred EHEC to use in a composition of the invention is EHEC of medical grade (Berol Nobel, Sweden), that is ethyl hydroxyethyl cellulose ethers having a cloud point of 30°–35° C., especially 32°–35° C. These cellulose ethers normally have a $DS_{ethyl}$ of 1.2–2.5 and an $MS_{EO}$ of 0.5–1.5, but they may also contain minor amounts of other substituents, such as methyl and hydroxypropyl. The degree of polymerisation of said cellulose ethers could be 200–600, preferably 500–600. The viscosity of said EHEC is 30–400 cP in a 1% aqueous solution as measured according to Brookfield LV, 12 rpm at 20° C. The medical grade EHEC is more hydrophobic than the grades of EHEC which are commercially available today.

The surfactant should contain either a positively or a negatively charged headgroup. Examples of the former surfactants are alkyl ammonium compounds (e.g. hexadecyltrimethylammonium, tetradecylbetainate hexadecylpyridinium salts, e.g. chloride and bromide). Examples of the latter are alkyl sulphates (sodium dodecyl sulphate), alkyl ether sulphates (sodium dodecyl monoethyleneoxide sulphate), alkyl sulphonates (sodium dodecyl sulphonate), alkyl phosphates (sodium dodecyl phosphate), alkyl phosphonates (sodium dodecyl phosphonate), alkylarylsulphonates (sodium p-dodecylbenzene sulphonate) and salts of saturated and unsaturated fatty acids (potassium and sodium dodecanoate, tetradecanoate, hexadecanoate, octadecanoate, 9-hexadecenoate, cis-9-octadecenoate). The examples listed above normally contain a single hydrocarbon chain which should contain between 10 and 20 carbon atoms in order to interact strongly enough with the polymer. Other examples are amine acid and carbohydrate based surfactants, e.g. acyl glutamates and salts of acyl arginine esters (N-myristoyl-L-argine methyl ester, hydrochloride), and puranosyl glycerides, respectively.

It is also possible to use ionic double-chained surfactants and lipids with more than 8 carbons per chain, such as phospholipids (e.g. phosphatidyl glycerols, phosphatidyl serins, and phosphatidyl inositols), dialkyl ammonium compounds, dipuranosyldiglycerides (e.g. digalactosyldiglyceride), and Aerosol OT (sodium bis(2-ethylhexyl)sulpho succinate).

The preferred surfactant would be ionized at low pH.

The amount of surfactant is of the same order of magnitude as the critical micelle concentration (CMC) in a polymer-free solution. The optimum concentration of the surfactant in the composition of the invention is in the order of 0.2–5 times the CMC.

The origin of the gel formation is a strong hydrophobic interaction between polymer and surfactant which is cooperative in nature and thus resembles normal micelle formation. Surfactant clusters formed in this way may then act as cross-links between different polymer chains, giving rise to an extended three-dimensional gel structure. The electrostatic repulsion between different surfactant clusters may lead to chain expansion of the polymer which may also contribute to the increase in gelling/viscosity. Furthermore, and most importantly, the hydrophobic attraction between the two species has been shown to be promoted by an increase in temperature—a surprising experimental fact—explained as a result of increased hydrophobicity of the polymer upon heating. The whole process is reversible: on cooling, the system regains its original properties.

It is possible to control the gel formation, both the temperature at which maximum viscosity occurs and the strength of the gel, by different means. This is performed by varying the concentration of either the cellulose ether or the surfactant. Alternatively, the gel-forming strength could be altered by replacing the surfactant with another which binds either less or more strongly to the polymer. A more amphiphilic surfactant, reflected in having a longer alkyl chain and thus a lower CMC, would bind more strongly to the polymer and give rise to a stronger gel on heating at a lower surfactant concentration than would be produced by a less amphiphilic surfactant.

The ratio of surfactant to cellulose ether should be 1:5 to 1:25 by weight. Generally this ratio is about 1:10. The total concentration of cellulose ether and surfactant in the composition is comparatively low, it should not exceed 2% by weight and preferably be from 0.5 to 1.5% by weight.

Once the gel is formed it is very resistant to the effects of high salt concentrations; actually, salt promotes the gelling in different ways. Firstly, the adsorption of surfactants on to the polymer chain is favoured by the diminished electrostatic repulsion between charged headgroups caused by the added counterions; this leads to a decrease in the concentration of singly dispersed surfactant molecules. Secondly, a high salt content leads to a reduced solubility of the polymer reflected in increased interpolymer attractions; all in all, the three-dimensional network built-up by polymer chains and surfactant clusters is strengthened.

However, if salt is present in the polymer solution during the preparation (e.g. in physiological amounts), higher surfactant concentrations are necessary.

In accordance with a preferred embodiment of the invention the dietary fibre composition also comprises a nonionic, low-molecular compound in an effective isotonic amount. This produces an isotonic gel which does not undergo shrinkage in a physiological medium. Examples of said low-molecular compounds are sucrose, glucose, glycerol.

The dietary fibre composition can in addition contain optional additives known in the art for improving different aspects of the composition, such as flavouring agents, colorants and preservatives.

At, or below, room temperature, the dietary fibre composition, e.g. a water-based EHEC-surfactant system, is a clear, low-viscous aqueous solution without unpleasant taste and smell. The water content could be as high as 99 wt %, which means that the liquid fibre composition is easy to drink. In order to obtain a clear aqueous EHEC solution, within a reasonable amount of time, it is important to disperse the EHEC powder in a special manner. The temperature of the water must be higher than the cloud point temperature of the polymer solution; furthermore, the water should be added during vigorous agitation. Only by employing this technique, the formation of lump particles is avoided, i.e. solid powder particles surrounded by a gel layer, which exhibit prolonged dissolution times.

In order to have a bulk laxative effect a substance should increase the volume of the faecal mass by binding water, thus the best laxatives are those which are not extensively degraded in the gut.

Predictions about the stool-bulking ability of the fibre composition of the invention can be made from the results of an in-vitro fermentation technique using fresh human faeces (Tomlin et al, 1989, Nutr. Rep. Int. 39, 121–135).

Results with the EHEC/SDS system indicate that the bacteria do not ferment EHEC to any degree, that they do interact in some way to remove the gel-like structure but leave a viscous solution, and that the presence of SDS reduces the amount of hydrogen gas which is normally produced during the fermentation of other substrates.

The lack of fermentation and maintenance of some structure allow the prediction that the invention would be effective at increasing stool mass and therefore should be useful as a laxative.

Tests in vitro as well as in vivo have shown that the composition of the invention gels in gastric juice and that this gel is also retained in intestinal juice. Tests on rats have shown in addition that the fibre composition delays gastric emptying. It has been postulated that the control of appetite is mediated partly through the rate of gastric emptying, as this determines gastric distension, and the rate of delivery of nutrients to the duodenum. Slowing gastric emptying has been suggested as a means of increasing feelings of satiety, in order to produce a therapeutic decrease in food intake. The fibre composition of the invention should therefore be useful in the treatment of obesity or as a slimming aid.

Cellulose ethers are generally nontoxic and high purity grades of most commercial products are approved as food additives and for use in cosmetics as well as pharmaceutical compositions.

The dietary fibre composition will be supplied in liquid form with instructions for it to be kept cool in order to prolong the long-term stability, but also in order to reduce the viscosity as much as possible.

To cause an effective restriction on food intake, a minimum dose of around 0.5 g cellulose ether+surfactant (≈50 ml of the composition) is probably necessary. If the composition does not comprise an isotonic amount of a nonionic, low-molecular compound, the degree of contraction of the gel in stomach juices may be important, and the minimum dose must be increased. The composition should be taken 15 min to 30 min before meals or whenever hunger is felt. The daily dose would therefore be around 250 ml (assuming 5 ingestions per day) or 2.5 g cellulose ether. The maximum daily dose for slimming purposes without noticeable laxation will probably be around 6 g/d, which could also be provided in two 300 ml drinks.

In order to have a laxative effect the dose could be 1–15 g/d.

The invention is further illustrated by the following examples and tests.

EXAMPLES

Nonionic cellulose derivatives and ionic surfactants are mixed in water to give a relatively easily flowing solution at room temperature. The surfactants could either be negatively or positively charged. If such a system, containing appropriate types and amounts of cellulose ether and cosolutes, is heated to 30°–42° C., in particular 37° C., its rheological properties will be drastically changed, leading to the reversible formation of a stiff and transparent gel. Representative systems are described below.

It is also demonstrated that nonionic cellulose derivatives having a cloud point over 35° C. do not form a gel at body temperature.

In the following examples the viscosity values, η, refer to steady-flow viscosity of a 1.0 wt % solution of the cellulose ether in water and in water and surfactant respectively, measured on a Bohlin VOR rheometer at the stated shear rate.

The cloud point, (CP; flocculation or phase separation temperature) has been determined for a 1.0 wt % solution of the cellulose ether in water, heated at a rate of 10° C./min, on a Mettler FP5+FP51 spectrophotometer. In the following tests and examples all percentages refer to percent by weight.

The tests in the examples below were performed with ethyl hydroxyethyl cellulose, EHEC, of different qualities, i.e.:

|  | $DS_{ethyl}$ | $MS_{EO}$ | CP, °C. | η, mPas |
|---|---|---|---|---|
| EHEC A | 1.7 | 1.0 | 34.0 | 42 |
| EHEC B | 1.9 | 1.3 | 34.4 | 89 |
| EHEC Bermocoll ® CST 103 Batch 1 | 1.5 | 0.7 | 35.9 | 40 |
| EHEC Bermocoll ® CST 103 Batch 2 | 1.5 | 0.7 | 36.8 | 46 |
| EHEC Bermocoll ® E230 G | 0.8 | 0.8 | 63 | 40 |

Viscosity values (η) were measured at a shear rate of 7.31 $s^{-1}$ at 20° C;

Example 1

| Composition | Concentration % |
|---|---|
| Ethyl hydroxyethyl cellulose (EHEC A) | 0.75 |
| Tetradecyl betainate (TDB) | 0.15 |
| Water, deionized | 99.1 |

Viscosity at different temperatures

| Temperature*, °C. | 20 | 25 | 30 | 35 | 37 | 40 |
|---|---|---|---|---|---|---|
| η**, mPas | 130 | 1,100 | 6,600 | 72,000 | 46,000 | 27,000 |

*dT/dt = 2° C./min
**Shear rate 0.233 $s^{-1}$

Viscosity at different concentrations of surfactant

|  | η*, mPas | |
|---|---|---|
| TDB conc., % | 20° C. | 37° C. |
| 0 | 25 | |
| 0.10 | 74 | 73,000 |
| 0.12 | 93 | 54,000 |
| 0.15 | 130 | 15,000 |

*Shear rate 0.233 $s^{-1}$
**Thermal equilibrium time 8 min

Example 2

| Composition | Concentration, % |
|---|---|
| Ethyl hydroxyethyl cellulose (EHEC B) | 1.0 |
| Sodium dodecyl sulphate (SDS) | 0.09 |
| Water, deionized | 98.91 |

Viscosity at different temperatures

| Temperature, ° C. | 20.1 | 25.3 | 30.4 | 33.3 | 35.0 | 36.8 | 37.5 | 38.3 | 39.0 | 39.8 | 42.3 | 43.3 |
|---|---|---|---|---|---|---|---|---|---|---|---|---|
| η**, Pas | 0.32 | 0.47 | 1.21 | 2.70 | 5.56 | 15.5 | 39.2 | 66.0 | 90.4 | 114 | 130 | 111 |

*dt/dt = 1° C./min
**Shear rate 0.216 s–1

Viscosity at different concentrations of surfactant

|  | η*, mPas | |
|---|---|---|
| SDS conc., % | 20° C. | 37° C. |
| 0.09 | 147 | 108,000 |
| 0.12 | 500 | 86,000 |
| 0.14 | 1,290 | 36,000 |

*Shear rate 0.216 $s^{-1}$
**Thermal equilibrium time 8 min

-continued

Example 3

| Composition | Concentration.% |
|---|---|
| Ethyl hydroxyethyl cellulose (EHEC B) | 1.0 |
| Cetyltrimethylammonium bromide (CTAB) | 0.15–0.22 |
| Water, deionized | 99.85–98.78 |

Viscosity at different concentrations of surfactant

| | $\eta^*$, mPas | |
|---|---|---|
| CTAB conc., % | 20° C. | 37° C. |
| 0.15 | 194 | 10,500 |
| 0.18 | 270 | 8,200 |
| 0.22 | 296 | 8,200 |

*Shear rate 0.216 s$^{-1}$
**Thermal equilibrium time 8 min

When EHEC Bermocoll® CST 103, Batches 1 and 2, respectively, were combined with SDS and water as described in Example 2 no gelling occurred after heating as confirmed by ocular inspection.

TEST ON GEL FORMATION IN GASTRIC JUICE IN VITRO

The gel forming ability in vitro in simulated gastric juice is tested below for a number of compositions according to the invention and also for some commercial dietary fibre products, all at recommended doses. The gastric juice test solution is prepared according the recipe in USP XXII: pepsin (3.2 g), dissolved in hydrochloric acid (7.0 ml), and sodium chloride (2.0 g) are mixed and dissolved in 1000 ml water. 25 ml of the test solution is transferred to a container immersed in a thermostat bath (37° C.). 5 ml of the polymer solution/dispersion to be examined is then gently added to the test solution (no stirring) and the fate of resulting system is visually followed over a certain period of time. Alternatively, a solid dosage form (powder or granules) is added to the test solution.

Possible changes of the polymer solution/dispersion are gel formation, flocculation or mixing/dilution. The solid dosage form is anticipated to be dispersed and subsequently dissolved.

System A (solution)
0.85% EHEC B+2.6% glycerol+0.087% SDS in water: Gel formation with no appreciable change in size after 1 h. The gel has a somewhat milky appearance due to the high ionic strength of the gastric juice which leads to partial phase separation on the surface of the gel lump. Cooling to room temperature leads to a complete mixing and disappearance of the gel.

System B (solution)
0.85% EHEC B+2.6% glycerol+0.087% sodium bis(2-ethylhexyl)sulfosuccinate (Aerosol OT) in water: Gel formation with no appreciable change in size after 1 h. The gel has a somewhat milky appearance due to the high ionic strength of the gastric juice which leads to partial phase separation on the surface of the gel lump. Cooling to room temperature leads to a complete mixing and disappearance of the gel.

System C (solution)
0.85% EHEC B+0.087% SDS in water: Gel formation (white); the gel undergoes shrinking due to an unfavourable osmotic balance—after 1 h the size is reduced by ca 50%. At any instant, cooling to room temperature leads to a complete mixing and disappearance of the gel.

System D (solution)
0.85% EHEC B: Immediate dilution leading to complete mixing.

System E (solution)
0.85% EHEC Bermocoll® CST 103 Batch 1+0.087% SDS in water: No gel formation—instead the formulation is completely diluted. The same applies to EHEC Bermocoll® CST 103 Batch 2 and EHEC Bermocoll® E230 G.

System F (solution)
1.0% Methyl cellulose (Methocel MC, medium viscosity, Fluka, Buchs, Switzerland) (CP=37° C.; n=40 mPas)+0.12% SDS in water: No gel formation—instead the formulation is completely diluted.

System G (dispersion)
3–4 g guar gum (Sigma, St. Louis, Mo., USA) in 100–150 ml water: After mixing, the dispersion is very rapidly transformed to a highly viscous slurry. The slurry mixes completely with gastric juice.

System H (dispersion)
3–4 g Testa Ispaghula (Lunelax®, Tika, Lund, Sweden) in 100–150 m water: After mixing, the dispersion is very rapidly transformed to a highly viscous slurry. The slurry is completely diluted when mixed with simulated gastric juice.

System I (dispersion)
3–4 g EHEC powder (Bermocoll® E230 G, Berol Nobel, Stenungsund, Sweden) in 100–150 ml water: Here the swelling is much weaker than that for guar gum and Testa Ispaghula, and the resulting dispersion is heterogeneous with large gel lumps floating around in the aqueous phase. The gel particles are salted out in simulated gastric juice, to an extent which is dependent on the flocculation temperature of the polymer. If EHEC powder or granules are administered directly to the gastric juice no gel formation is observed.

TEST ON GEL MAINTENANCE IN INTESTINAL JUICE IN VITRO

A simulated intestinal juice was prepared as follows in accordance with USP XXII: $KH_2PO_4$ (6.8 g) is dissolved in deionized water (250 ml). 0.2M NaOH (190 ml) and deionized water (400 ml) are then added and mixed. To this solution pankreatin (10.0 g) is added and the pH is adjusted to 7.5±0.1 with 0.2M NaOH. The final volume (1000 ml) is adjusted with water.

The gel formed in System A above was after 2 h transferred to the simulated intestinal juice, heated to 37° C. The gel was maintained in the new environment for at least 22 h.

The volume of the gel lump was only reduced by ca 50%.

|  | Concentration, % |
|---|---|
| a) Example on a liguid dietary fibre formulation | |
| EHEC of medical grade | 0.85 |
| Sodium dodecyl sulphate | 0.087 |
| Methyl parahydroxybenzoate | 0.05 |
| Sorbic acid | 0.15 |
| Glycerol | 2.6 |
| Orange flavour | 1.0 |
| Purified water | ad100.00 |
| b) Example on a liguid dietary fibre formulation | |
| EHEC of medical grade | 0.85 |
| Sodium dodecyl sulphate | 0.087 |
| Methyl parahydroxybenzoate | 0.125 |
| Glycerol | 2.6 |
| Black currant flavouring agent* | 0.05 |
| Red grape skin colouring agent* | 0.10 |
| Purified water | ad 100 |

*Fructus AB, Bromma, Sweden

The dietary fibre formulation is prepared in two steps: first, two solutions A and B are prepared; second, after allowing solution A to become completely clear, the two solutions are mixed and then appropriate amounts of additives are added.

For preparation the solution A, EHEC of medical grade (Berol Nobel, Stenungsund, Sweden) is dispersed in warm (ca. 40° C., i.e. above the cloud point temperature) water (50% of the total amount) and the dispersion is stirred slowly for 2 h to dissolve the polymer.

Solution B is prepared by dissolving the surfactant in the remaining amount of purified water (45%). The solution is heated to 70° C. and the preservatives added during vigorous stirring. The clear solution obtained is allowed to attain room temperature (<30° C.).

Solutions A and B are then mixed, glycerol is added and the mixture is stirred slowly overnight. The flavouring agent is added as well as water to the final weight.

It is possible to heat sterilize (121 ° C., 21 min) a solution consisting of EHEC of medical grade, sodium dodecyl sulphate and glycerol without affecting its properties. The resulting solution is then dispensed into single dose containers. Thereby the preservatives could be omitted in the formulation which is desirable from the viewpoint of taste.

TEST IN VIVO ON THE EFFECTS OF THE FIBRE COMPOSITION ON RATS

The possible beneficial use of the fibre composition of the invention as a dietary fibre preparation to reduce food intake depends on the gel structure being maintained in the gut and resisting disruption by gastric acid, intestinal enzymes and other secretions, which may also have a diluting effect.

A study into the effect of feeding a mixture of EHEC and the surfactant SDS (sodium dodecyl sulphate) to rats using the technique of Brown et al, 1988, Br J Nutr 59, 223–231, has been performed.

Method

The EHEC-surfactant mixture was prepared by dispersing EHEC of medical grade in sterile water (1% w/v), refrigerating overnight to improve solubility, and then adding SDS to a concentration of 4 mM. The SDS control solution was prepared by dissolving SDS in sterile water to a concentration of 4 mM.

A total of 79 albino rats were subdivided into 25 test (EHEC/SDS), 25 SDS controls and 29 water controls. Each rat was gavaged with 5 ml of the appropriate solution into which a known amount of $^{99m}$Technetium-sulphur colloid (Amersham) had been mixed so that each rat received approximately 25 μCi per 5 ml. The three groups were further divided into subgroups of 5 rats, each subgroup to be killed 25, 50, 100, 200 and 300 min after gavage by exposure to cyclopropane gas (for the water controls, 1 additional rat was used in the 100 and 200 min groups and 2 extra rats were in the 50 min group).

The gut was ligated at the lower oesophageal sphincter, the pylorus and the ileocaecal sphincter, and transferred into a long trough containing saline at 37° C. The trough was pulled under a scintillation counter to obtain a profile of the distribution of the radioactivity along the gut.

The results are expressed as means. Statistical significance was established using unpaired Student's t tests.

Results

The presence of EHEC with SDS significantly retarded gastric emptying. Table I shows that the proportion of radioactivity in the stomach does not change from 25 min to 200 min ($p>0.05$); only at 300 min has there been any significant movement out through the pylorus ($p<0.05$). At 25 min the major amount of the composition is in the stomach, with a small amount spread down the small intestine. This pattern does not change until 300 min when for the first time there is more label in the duodenum than in the stomach.

EHEC/SDS delayed small intestinal transit. The head of the meal had reached the end of the small intestine (section 10) in all rats by 50 min for SDS controls but took 100 min for EHEC/SDS and the water controls. The head was in the caecum by 50 min in the SDS control group, by 100 min in the water controls but took until 200 min in the EHEC/SDS group. A clear retardation of gut movement by the EHEC/SDS could be observed. There was no significant difference between the SDS controls and the water controls in any of the measurements.

Relatively more radioactivity was present in the duodenum (section 1 of small intestine) throughout 300 min when EHEC/SDS was present (Table 1; $p<0.05$). There was more in the proximal intestine (sections 2+3+4) during the later stages of the experiment, however this was because there was less in the mid and distal portions and the caecum and colon compared to the controls. The EHEC with SDS distribution curve changes very little between 25 and 300 min suggesting little further movement once the distribution is established (before 25 min).

There was significantly less radioactivity present in the caecum of animals fed EHEC/SDS than controls for all times after radioactivity first arrived there (50 min onwards; Table 1; $p<0.05$). The rate of caecal filling was significantly reduced by the EHEC/SDS; the amount present increased only slightly after it first arrived there at 100 min.

These results show that EHEC/SDS dramatically delayed the delivery of the marker from the stomach into the small intestine and from there into the caecum.

If these results are extrapolated to the feeding of EHEC/SDS to humans then it would be expected that the formation of a gel in the stomach would also significantly delay gastric emptying and modify nutrient absorption rate.

TABLE 1

| | Percentage radioactivity present (means and standard errors below) | | | | | | | | | | | |
|---|---|---|---|---|---|---|---|---|---|---|---|---|
| | Stomach | 1 | 2 | 3 | 4 | 5 | 6 | 7 | 8 | 9 | 10 | C&C |
| 25 min | | | | | | | | | | | | |
| EHEC/SDS | 27.1 | 19.1 | 14.1 | 10.5 | 7.4 | 5.6 | 4.9 | 4.0 | 3.1 | 2.7 | 2.4 | 0 |
| n = 5 | 0.8 | 1.6 | 2.3 | 1.5 | 0.7 | 0.3 | 0.4 | 0.7 | 0.7 | 0.7 | 0.6 | |
| | * | * | | | * | * | * | * | * | | | |
| SDS control | 12.6 | 7.5 | 13.9 | 12.8 | 13.7 | 12.9 | 12.9 | 10.4 | 6.4 | 3.1 | 0.4 | 0 |
| n = 5 | 1.7 | 0.8 | 2.2 | 1.6 | 1.2 | 1.6 | 1.2 | 0.6 | 1.1 | 0.8 | 0.3 | |
| Water | 21.2 | 11.1 | 20.2 | 17.0 | 14.7 | 13.3 | 10.8 | 8.4 | 3.4 | 0.8 | 0 | 0 |
| n = 5 | 3.1 | 1.7 | 1.9 | 1.2 | 2.0 | 1.7 | 1.6 | 0.7 | 1.3 | 0.8 | | |
| 50 min | | | | | | | | | | | | |
| EHED/SDS | 25.4 | 17.0 | 15.1 | 10.4 | 7.6 | 6.3 | 5.3 | 4.2 | 3.4 | 2.9 | 2.3 | 0.5 |
| n = 5 | 2.6 | 1.5 | 2.6 | 1.4 | 0.7 | 0.5 | 0.7 | 1.0 | 0.7 | 0.8 | 0.8 | 0.5 |
| | * | * | * | | | | * | * | * | * | * | * |
| SDS control | 8.8 | 5.7 | 8.8 | 7.2 | 7.2 | 7.1 | 10.5 | 10.3 | 12.4 | 12.0 | 8.4 | 3.3 |
| | 1.6 | 0.8 | 1.1 | 1.1 | 0.6 | 0.6 | 1.0 | 1.4 | 2.0 | 1.8 | 1.6 | 0.5 |
| Water | 12.2 | 6.5 | 12.3 | 9.3 | 7.8 | 8.4 | 10.2 | 10.9 | 12.6 | 5.5 | 6.8 | 3.6 |
| n = 7 | 2.2 | 1.4 | 1.9 | 1.7 | 0.8 | 1.5 | 2.6 | 2.4 | 1.5 | 1.7 | 2.9 | 1.2 |
| 100 min | | | | | | | | | | | | |
| EHEC/SDS | 29.7 | 19.1 | 12.0 | 8.1 | 6.9 | 4.9 | 4.4 | 4.0 | 3.8 | 3.5 | 3.3 | 1.4 |
| n = 5 | 4.1 | 0.6 | 0.2 | 0.3 | 0.5 | 4.7 | 0.4 | 0.7 | 0.7 | 0.9 | 0.5 | 0.7 |
| | * | * | * | * | | | * | * | * | * | * | * |
| SDS control | 5.3 | 3.1 | 6.0 | 4.8 | 4.9 | 5.8 | 8.8 | 10.0 | 15.1 | 14.0 | 17.2 | 0.5 |
| n = 5 | 0.9 | 1.2 | 1.2 | 1.0 | 0.8 | 0.7 | 1.3 | 0.8 | 1.4 | 2.5 | 2.4 | 0.7 |
| Water | 7.8 | 3.2 | 7.2 | 5.7 | 3.9 | 4.6 | 6.4 | 10.3 | 12.8 | 14.7 | 16.4 | 10.7 |
| n = 6 | 2.9 | 0.8 | 1.4 | 0.8 | 0.9 | 1.4 | 1.7 | 1.7 | 1.1 | 2.1 | 1.0 | 2.3 |
| 200 min | | | | | | | | | | | | |
| EHEC/SDS | 27.2 | 20.5 | 11.9 | 8.4 | 6.6 | 4.9 | 4.4 | 3.7 | 3.6 | 3.2 | 3.9 | 3.1 |
| n = 5 | 2.6 | 0.8 | 0.4 | 0.4 | 0.5 | 0.5 | 0.8 | 0.6 | 0.6 | 0.4 | 0.3 | 0.7 |
| | * | * | * | * | * | | | * | * | * | * | * |
| SDS control | 2.3 | 1.7 | 3.7 | 3.2 | 3.8 | 4.9 | 7.2 | 8.3 | 12.8 | 17.7 | 16.3 | 19.0 |
| n = 5 | 0.6 | 0.1 | 0.9 | 0.4 | 0.2 | 0.7 | 0.8 | 1.1 | 0.6 | 0.6 | 0.8 | 3.8 |
| Water | 3.9 | 1.9 | 4.3 | 3.3 | 3.3 | 3.9 | 5.8 | 7.7 | 12.0 | 16.2 | 18.0 | 20.5 |
| n = 6 | 1.6 | 0.5 | 1.3 | 0.8 | 0.8 | 0.5 | 1.0 | 0.7 | 0.6 | 1.7 | 1.9 | 2.5 |
| 300 min | | | | | | | | | | | | |
| EHEC/SDS | 22.2 | 23.3 | 14.6 | 7.5 | 5.0 | 4.2 | 3.8 | 3.4 | 3.4 | 4.3 | 6.1 | 3.8 |
| n = 5 | 1.3 | 1.7 | 0.6 | 0.3 | 0.3 | 0.2 | 0.3 | 0.3 | 0.1 | 0.5 | 1.9 | 1.1 |
| | * | * | * | * | * | * | * | * | * | * | * | * |
| SDS control | 1.4 | 1.2 | 2.3 | 2.7 | 3.4 | 4.5 | 6.5 | 9.5 | 13.1 | 18.4 | 17.8 | 19.7 |
| n = 5 | 0.3 | 0.3 | 0.3 | 0.3 | 0.4 | 0.5 | 0.5 | 0.4 | 0.4 | 0.7 | 1.7 | 1.3 |
| WATER | 1.6 | 1.6 | 2.3 | 2.8 | 3.1 | 4.2 | 6.0 | 8.3 | 13.0 | 15.9 | 20.7 | 21.3 |
| n = 5 | 0.7 | 0.4 | 0.5 | 0.3 | 0.3 | 0.3 | 0.5 | 0.9 | 1.1 | 0.8 | 2.1 | 2.7 |

*indicates significant difference from corresponding SDS control (p < 0.05)
indicates significant difference from corresponding water control (p < 0.05)

TEST ON THE GASTRIC EMPTYING OF LIQUID FIBRE IN MAN

Method

Ten normal male volunteers were recruited for the paired study in which liquid fibre was compared to a placebo; their compositions are as follows Composition of liquid fibre and placebo

| | MASS in 100 g | |
|---|---|---|
| COMPONENT | LIQUID FIBRE DRINK | PLACEBO DRINK |
| EHEC of medical grade | 850 mg | — |
| SDS | 87 mg | — |
| Methyl p-hydroxybenzoate | 50 mg | 50 mg |
| Sorbic acid | 150 mg | 150 mg |
| PFW Pomerans aroma | 1 g | 1 g |
| Glycerol | 2.6 g | 2.6 g |
| Purified water, up to | 100 g | 100 g |

Gastric emptying was measured by adding 1.85 MBq of $^{99m}$Tc-tin colloid to the drinks (250 ml) and monitoring the movement of radioactive label from the stomach using a gamma-camera.

Results

The mean emptying curve for ten male, normal volunteers on liquid fibre (crosses and unbroken line) and placebo (open circles and broken line) showing the mean value for %-age radioactivity present in the stomach region against time is given in FIG. 1. Standard errors (SE) for each of the mean values are shown by error bars.

Liquid fibre delayed the half-empying time from a mean of 17.7 min on placebo (SE 2.0) to 55.8 min (SE 7.1) on liquid fibre (p<0.05). This incorporated both an increase in the lag period and a decrease in the rate of emptying.

The lag period (the time for 10% of the label to empty) was prolonged in all ten paired studies. It was increased from a mean of 7.0 minutes (SE 0.9 min) on the placebo to 19.4 rain (SE 2.4) on liquid fibre (p<0.05).

The rate at which the stomach was emptying at this t½ was reduced from 3.00% per minute (SE 0.42) on placebo to 1.91% per minute (SE 0.36) on liquid fibre. This rate was calculated from the gastric emptying curves by measuring the %-age radioactivity emptied in the 5 minutes on either side of the t½ time.

None of the volunteers reported any ill effects, nor were any observed although some found the flavour (Pomerans aroma) unpalatable.

Liquid fibre dramatically delayed stomach emptying in normal human volunteers. It delayed both the time at which the stomach begins to empty (the lag), and the rate at which it empties and so prolonged the half-emptying time dramatically. It gave a profile which is more typical of solid emptying than liquid, which is consistent with the expectation that it would form a firm gel in the stomach.

The unequivocal results of this study, that liquid fibre causes a dramatic delay in gastric emptying, supports the idea that liquid fibre may be useful clinically. It may be useful in the management of dumping syndrome in which symptoms are thought to be caused by an unnaturally rapid delivery of the meal out of the stomach into the intestine. It may help control diabetes by delaying and slowing the rate of absorption of glucose. It may also prove useful as a drug delivery system in the gastrointestinal tract.

TEST ON THE EFFECT OF LIQUID FIBRE ON COLON FUNCTION IN MAN

Twelve healthy male volunteers supplemented their normal diets with 200 ml/d liquid fibre drink (0.85% EHEC, 3 mM SDS, composition as above) for 14 d. Control periods of 14 d were also performed with (a) no supplement and (b) a standard dose of the established laxative agent FYBOGEL (3.5 g/d formulated ispaghula husk; Reckitt & Colman PLC, Hull, UK). The volunteers took radioopaque markers each day to allow the calculation of whole-gut transit time. During the last 10 d of each period they collected all stools produced into plastic bags, kept a diary of the amount of flatulence they produced and recorded the consistency of their faeces. At the end of each period they completed visual analogue scales about their subjective assessments of their colon function.

Although both supplements tended to increase the amount of faeces produced compared to the control, neither of these effects was significant. Transit time was significantly faster during liquid fibre than during the control (p<0.05). Stool frequency, consistency and flatulence frequency were unaffected by the supplements although flatulence declined slightly on liquid fibre, see Table below.

The questionnaires revealed that the volunteers thought that both FYBOGEL and liquid fibre significantly increased the amount of faeces they produced (59 and 54 cf. 49, p<0.10) and in addition that liquid fibre reduced their estimation of the amount of flatulence they produced (47 cf. 56, p<0.10).

Liquid fibre has some promise as a laxative agent; transit time was significantly reduced in these normal volunteers and the mass of stools tended to increase. Although the increase in stool mass was not significant, there was also no effect of the standard laxative FYBOGEL and there was no significant difference between the two preparations. As these were healthy volunteers it would be difficult to observe an increase in stool mass; experiments are in progress in constipated patients. Liquid fibre had the added advantage that the volunteers thought it reduced their flatulence (which reflects results of previous in-vitro studies).

| | Effect on colon function | | |
|---|---|---|---|
| | CONTROL | LIQUID FIBRE | FYBOGEL |
| Total stool mass (g/10d) | 1859 | 1941 | 1961 |
| Median transit time (h) | 56.7 | 47.3 | 49.5 |
| Stool frequency (/10 d) | 12.4 | 12.6 | 11.8 |
| Flatulence frequency (/10 d) | 99 | 94 | 100 |
| Mean consistency (scale 1–8) | 4.7 | 4.6 | 4.5 |

We claim:

1. A dietary fibre composition comprising a water-soluble, nonionic cellulose ether having a cloud point not higher than 35° C., a charged surfactant, a nonionic, low-molecular weight compound in an effective isotonic amount, and optional additives in water, the ratio of surfactant to cellulose ether being 1:5 to 1:25 by weight and the concentration of cellulose ether and surfactant being up to 2% by weight, which composition is a liquid solution at room temperature and a gel in the gastrointestinal tract at body temperature.

2. A dietary fibre composition according to claim 1, wherein the concentration of cellulose ether and surfactant is 0.5–1.5% by weight.

3. A dietary fibre composition according to claim 2 for use as a slimming aid.

4. A dietary fibre composition according to claim 1, wherein the nonionic cellulose ether is an alkyl hydroxyalkyl cellulose, the alkyl groups of which have from 1 to 4 carbon atoms.

5. A dietary fibre composition according to claim 4, wherein the alkyl hydroxyalkyl cellulose is an ethyl hydroxyethyl cellulose having a $DS_{ethyl}$ value of 1.2–2.5, a $MS_{EO}$ value of 0.5–1.5 and a cloud point of 30°–35° C.

6. A dietary fibre composition according to claim 1, wherein the surfactant is used in an amount corresponding to 0.2–5 times the critical micelle concentration.

7. A dietary fibre composition according to claim 1, wherein the surfactant comprises a positively or negatively charged headgroup and a hydrocarbon chain having from 10 to 20 carbon atoms.

8. A dietary fibre composition according to claim 1, comprising 0.5–1.5% by weight ethyl hydroxyethyl cellulose, 0.05–0.15% by weight of a surfactant from the group consisting of sodium dodecyl sulphate, sodium dodecyl sulphonate and sodium dodecyl benzene sulphonate and 2.6% by weight glycerol.

9. A dietary fibre composition according to claim 7 for use as a bulk laxative.

10. A dietary fibre composition according to claim 1 for use as a slimming aid.

11. A dietary fibre composition according to claim 2 for use as a bulk laxative.

12. A dietary fibre composition according to claim 2, wherein the nonionic cellulose ether is an alkyl hydroxyalkyl cellulose, the alkyl groups of which have from 1 to 4 carbon atoms.

13. A dietary fibre composition according to claim 7 wherein said hydrocarbon chain has 12 to 18 carbon atoms.

14. A dietary fibre composition according to claim 2, wherein the surfactant is used in an amount corresponding to 0.2–5 times the critical micelle concentration.

15. A dietary fibre composition according to claim 5 wherein said cloud point is 32°–35° C.

16. A dietary fibre composition according to claim 2, wherein the surfactant comprises a positively or negatively charged headgroup and a hydrocarbon chain having from 10 to 20 carbon atoms.

17. A dietary fibre composition according to claim 2, comprising 0.5–1.5% by weight ethyl hydroxyethyl cellulose, 0.05–0.15% by weight of a surfactant from the group consisting of sodium dodecyl sulphate, sodium dodecyl sulphonate and sodium dodecyl benzene sulphonate and 2.6% by weight glycerol.

* * * * *